(12) United States Patent
Richer et al.

(10) Patent No.: US 11,656,862 B2
(45) Date of Patent: May 23, 2023

(54) UPDATING OF A DOMESTIC APPLIANCE

(71) Applicant: BSH HAUSGERAETE GMBH, Munich (DE)

(72) Inventors: Thomas Richer, Munich (DE); Fabian Unterreiner, Munich (DE)

(73) Assignee: BSH Hausgeraete GmbH, Munich (DE)

( * ) Notice: Subject to any disclaimer, the term of this patent is extended or adjusted under 35 U.S.C. 154(b) by 48 days.

(21) Appl. No.: 17/264,380

(22) PCT Filed: Jul. 17, 2019

(86) PCT No.: PCT/EP2019/069218
§ 371 (c)(1),
(2) Date: Jan. 29, 2021

(87) PCT Pub. No.: WO2020/025318
PCT Pub. Date: Feb. 6, 2020

(65) Prior Publication Data
US 2021/0271468 A1    Sep. 2, 2021

(30) Foreign Application Priority Data
Jul. 31, 2018 (DE) .................. 10 2018 212 726.3

(51) Int. Cl.
*G06F 8/65* (2018.01)
*G06F 9/445* (2018.01)

(52) U.S. Cl.
CPC ............ *G06F 8/65* (2013.01); *G06F 9/44505* (2013.01)

(58) Field of Classification Search
CPC .............................. G06F 8/65; G06F 9/44505
See application file for complete search history.

(56) References Cited

U.S. PATENT DOCUMENTS

| 8,561,054 | B2 | 10/2013 | Smirnov et al. | |
|---|---|---|---|---|
| 2006/0146847 | A1* | 7/2006 | Mihara | G06F 9/4484 370/409 |
| 2009/0244864 | A1* | 10/2009 | Kim | H05K 1/162 428/141 |

(Continued)

FOREIGN PATENT DOCUMENTS

| CN | 105633026 A | * | 6/2016 | ....... H01L 23/49822 |
|---|---|---|---|---|
| DE | 102009018761 A1 | | 10/2010 | |

(Continued)

*Primary Examiner* — Daxin Wu
(74) *Attorney, Agent, or Firm* — Laurence A. Greenberg; Werner H. Stemer; Ralph E. Locher

(57) ABSTRACT

A method for updating a domestic appliance includes determining a configuration of the domestic appliance, wherein the configuration relates to a state of at least one component of the domestic appliance. A restriction assigned to predefined update information is determined for domestic appliances, including the domestic appliance. The control information of at least one component of the domestic appliance is updated on a basis of update information if the configuration of the domestic appliance meets the restriction. The configuration includes an attribute of a component of the domestic appliance, and the attribute is determined on the basis of an identification of the domestic appliance and an assignment of the identification to the attribute.

10 Claims, 3 Drawing Sheets

(56) References Cited

U.S. PATENT DOCUMENTS

| | | | | |
|---|---|---|---|---|
| 2011/0208841 A1* | 8/2011 | Robertson | ............ | G06F 15/177 |
| | | | | 709/220 |
| 2013/0042229 A1* | 2/2013 | Jang | ............ | G06F 8/65 |
| | | | | 717/171 |
| 2014/0122862 A1* | 5/2014 | Ludwig | ............ | G06F 8/65 |
| | | | | 713/100 |
| 2015/0236913 A1* | 8/2015 | Nakano | ............ | H04L 41/0893 |
| | | | | 709/223 |
| 2016/0218884 A1* | 7/2016 | Ebrom | ............ | H04L 12/2816 |
| 2017/0046147 A1* | 2/2017 | Neville | ............ | G06F 8/61 |
| 2017/0329596 A1* | 11/2017 | Butler | ............ | G06F 8/65 |
| 2019/0278579 A1* | 9/2019 | Brian | ............ | G06F 8/65 |
| 2019/0354381 A1* | 11/2019 | Takacs | ............ | G06F 9/44505 |
| 2019/0391803 A1* | 12/2019 | Jeong | ............ | G06F 8/65 |

FOREIGN PATENT DOCUMENTS

| | | | | |
|---|---|---|---|---|
| FR | 3023097 A1 * | 1/2016 | ............ | G06Q 30/016 |
| WO | WO-2018126314 A1 * | 7/2018 | ............ | G08C 17/00 |

* cited by examiner

UPDATING OF A DOMESTIC APPLIANCE

BACKGROUND OF THE INVENTION

Field of the Invention

The invention relates to the updating of a household appliance. In particular, the invention relates to the updating of a household appliance with a number of components which can exist in different configurations.

A household appliance comprises a number of components, of which at least one, which represents a combination of hardware and software, is embodied as a control apparatus. One such component can be updated by new software being added or existing software being changed or removed. Therefore a faulty control program can be corrected or a new function added, for instance. The household appliance can preferably be manufactured in series, wherein different embodiments of the household appliance can be manufactured in the same series. For instance, one part of the manufactured household appliances can be equipped with a first component and another part with another. This may be necessary, for instance, if the first component is no longer available in piece numbers or the second component has been found to be a better alternative. Moreover, different variants can be manufactured, of which, for instance, one has a predetermined component and another does not. One such component can also firstly be added to the household appliance at a subsequent point in time, either by means of a service person or by means of a user. The household appliance can exist in a plurality of different configurations by way of these variations.

To update the control apparatus it must be ensured that the updated control apparatus is compatible with the existing configuration. By means of this condition, the provision of generic update information can be difficult for a plurality of differently embodied, but essentially comparable household appliances.

US 2017 0 329 596 A1 suggests providing update information, which comprises a plurality of updates for components of the household appliance, in order then to decide, on the basis of a configuration of the household appliance, which of the updates are to be carried out.

SUMMARY OF THE INVENTION

An object underlying the present invention consists in specifying an improved technique of updating a household appliance, which can exist in a plurality of different configurations, by means of update information which is as generic as possible. The invention achieves this object by means of the subject matters of the independent claims. Subclaims reproduce preferred embodiments.

According to a first aspect of the present invention, a method for updating a household appliance comprises steps for determining a configuration of the household appliance, wherein the configuration relates to a state of at least one component of the household appliance; determining a restriction assigned to predetermined update information for household appliances, which comprise the household appliance; and updating control information of at least one component of the household appliance on the basis of update information if the configuration of the household appliance meets the restriction. Here the configuration comprises an attribute of a component of the household appliance, and the attribute is determined on the basis of an identification of the household appliance and an assignment of the identification to the attribute.

The components of the household appliance can be active or passive. An active component can preferably communicate so that its state can be determined dynamically. A passive component can comprise any facility.

The restriction can specify the configurations for which the update information is suited. By including the attribute in the configuration, it is possible to prevent an update on a component from failing, the state of which cannot be determined dynamically. For instance, an update of a WLAN module can comprise the support of a new protocol. To this end, a check can be carried out to determine whether the module attached in the household appliance has sufficient processing resources for the protocol and whether a driver stage is able to process the frequencies assigned to the protocol. The state of the module and its driver stage can be determined in particular by querying the module. However, the new protocol can use frequencies, for which a specific antenna is required, which is only installed in one part of a series of household appliances. Other installed antennas may not be suited or only poorly suited to the frequencies. However a specification of the antenna is possibly not known to the module. It is therefore suggested to determine an attribute, which, in the present case, relates to the usability of the antenna of the household appliance for the frequencies in question, on the basis of an identification of the household appliance. To this end, a database with identifications or household appliances and elements installed in the household appliance can be maintained. An attribute can be formed on the basis of information saved in the database and optionally stored in the database.

As a result, it may be easier to provide generic update information for a plurality of differently configured or equipped household appliances. A number of household appliances, which are not taken into account in the update information for economic reasons, for instance, can be reduced.

The restriction can comprise a plurality of configurations. In one variant, the restriction can comprise a list of configurations, for which the update information is authorized. Alternatively, a list of unauthorized configurations can also be managed. Authorized or unauthorized configurations can also be expressed parametrically. In yet another embodiment, the restriction can comprise a method which determines whether or not a given household appliance has an authorized configuration. The update information can be assigned to a plurality of household appliances, for instance all household appliances of a predetermined type, optionally restricted to a predetermined series or partial series, a predetermined production time frame or a predetermined layout.

The attribute can typically not be determined dynamically by any components of the household appliance. The element assigned to the attribute can be passive, by it not being able to communicate electronically by means of a communication protocol. However, it can be controlled by an active, communicable component.

The attribute can comprise in particular an existence, a variant, a design, an embodiment, or a capability of a component of the household appliance. By way of example, the attribute can comprise the type of bearing which is embodied in a first version as a sliding bearing and in a second version as a roller bearing. A particular update can only then be carried out if the bearing is present in the second version, for instance because the update can make greater demands on the bearing which means that the sliding bearing can be overburdened in the long run. The attribute can also comprise, for instance, a material of a component or a date of production, delivery, or installation of the component.

The attribute assigned to the identification can be changed. The change can take place for instance by replacing a damaged, worn, or outdated component. Here indication of the attached component can be assigned to an identification of the household appliance. The indication can be stored in particular in the afore-mentioned database. Alternatively, the indication can also be stored in electronic form on the household appliance. In addition to identifying the household appliance, a history of servicing interventions can also be used in order to determine an attribute.

The state can comprise an existence, embodiment, setting or version of control information of the component. One such component can communicate by means of a communication protocol and is therefore considered to be active. Practically any setting which can be determined by way of the protocol can be used to determine the state.

In a first variant the update information comprises an application program (application) for a component of the household appliance. An application program can be provided for instance for carrying out an optional function. The application program can also comprise a setting, which can likewise be updated.

In a second variant, the update information comprises an embedded program (firmware) of a component of the household appliance. One such program is typically connected fixedly to the component and can be stored in a special memory, which also conserves its contents in a currentless manner, for instance in a ROM, (E)EPROM or flash memory. By means of a user such a program can typically not be replaced or only using special means or functions. A firmware change can be tricky because, in the case of an error, the component's ability to communicate, which is required for a further change, can be damaged.

According to a second aspect of the present invention, a control facility for a household appliance with one or more components comprises a communication facility which is designed to receive update information; and a processing facility. Here the processing facility is designed to determine an attribute of at least one of the components on the basis of an identification of the household appliance; to determine a configuration of the household appliance on the basis of the attribute and a state of at least one of the components; and to update control information of at least one of the components on the basis of the update information if the configuration of the household appliance meets a predetermined restriction assigned to the update information.

According to a third aspect of the present invention, an update server comprises a communication facility; a first data memory for storing an identification of a household appliance and an attribute assigned to the identification; a second data memory for storing update information; and a processing facility. Here the processing facility is designed to determine an assigned attribute on the basis of an identification of a household appliance which is received by means of the communication facility; and to provide stored update information for the household appliance if a configuration of the household appliance, which comprises the particular attribute and the state of at least one component of the household appliance, fulfils a restriction assigned to the update information.

A control facility described herein and/or an update server described herein can be used to carry out a method described herein entirely or in parts. Here one of the processing facilities can comprise a programmable microcomputer or microcontroller, and the method can exist in the form of a computer program product with program code means. The computer program product can also be stored on a computer-readable data carrier. Features or advantages of the method can be transferred to the control facility or the update server and vice versa.

In one variant of a technique described herein the configuration can be determined by the household appliance, in particular by the control facility. In another variant, the configuration can be determined by the update server, in particular by its processing facility. In both cases information from components of the household appliance can be collected and processed by means of a communication protocol. The restriction can be fulfilled in both cases alternatively by the household appliance or by the update server.

The invention is now described in more detail with reference to the appended figures, in which:

DETAILED DESCRIPTION OF THE INVENTION

Figure 1:
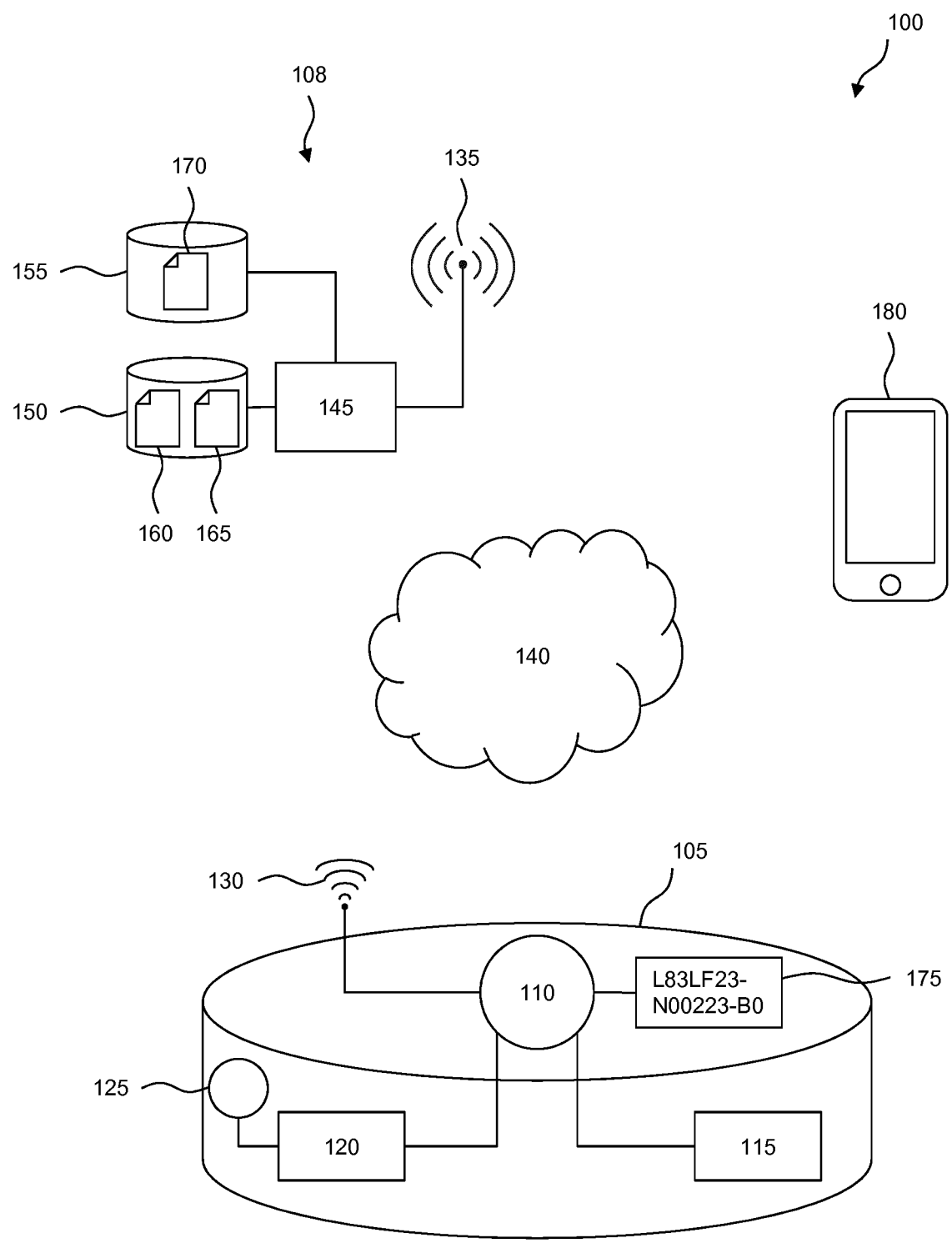
FIG. 1 shows an exemplary system with a household appliance and a remote location.

FIG. 1 shows an exemplary system 100 with a household appliance 105 and a remote location 108. The household appliance 105 can comprise, for instance, a floor processing machine such as a robot vacuum cleaner or an automatic lawn trimmer. In another embodiment, the household appliance 105 comprises a kitchen appliance. The household appliance 105 comprises a processing facility 110 and one or more components. A first exemplary component 115 is an active component by it being connected communicatively to the processing facility 110. The processing facility 110 can determine in particular a state of the active first component 115, by it querying the state or an indication of the state of the component 115. In the scope of the present explanation, the processing facility 110 can also be effective as a component of the household appliance 105.

A second exemplary component 120 is likewise active and designed to control a third component 125 which is passive. A passive component can be controllable by another component and optionally also comprise a sensor for providing a value to the other component but is not designed for communication. This typically means that a passive component 125 does not receive a message and can provide a differentiated response to the message. In particular, no communication protocol is provided with the passive component 125. The passive component 125 typically has no control apparatus in the form of a microcomputer or microprocessor. A passive component 125 can also be controlled directly by the processing facility 110. The passive component 125 can also be provided without a sensor or actuator terminal to the processing facility 110 or one of the components 115, 120. The passive component can therefore also comprise a housing, a bearing, or a container, for instance. The manner in which the passive component 115 is embodied or in which state it is found can however have an effect on a function which can be brought about by means of the processing facility 110 or one of the components 115, 120. In particular, an attribute of the passive component 115 can be incompatible or not recommended for a function with a program, which can be loaded onto the control apparatus 110 or one of the components 115, 120.

The processing facility 110 is preferably connected to a communication facility 130 for connection to the remote location 108. The remote location 108 comprises a corresponding communication facility 135, so that a communication can take place by way of a connection 140 which can comprise a section of a communication network. As a result, the remote location 108 can be attached at any position or also abstracted from the position as a service in a cloud. The communication facility 130 can likewise be considered to be an active or passive component of the household appliance 105.

The remote location 108 comprises a processing facility 145, a first data memory 150 and an optional second data memory 155. The first data memory 150 is designed to strip update information 160 which can be used to update a program or a parameter of the processing facility 110 or one of the components 115, 120. As a result, an existing function can be used, extended, or removed. The second data memory 155 preferably comprises an assignment table 170, which is designed to assign one or more items of information to a preferably unique identification 175 of a household appliance 105. Whether or not the update information 160 can be applied to a specific household appliance 105 can be retained in a restriction 165.

In order to update the household appliance 105, it is suggested to determine a configuration of the household appliance 105 in the form of states of at least one component 115, 120. Moreover, an attribute of a component 115-125 of the household appliance 105 can be determined on the basis of the identification 175, for instance with the aid of the assignment table 170 and can likewise influence the determined state. On the basis of the determined configuration, it can then be determined whether the update information 160 is suited to use on the household appliance 105. If this is the case, one or more of the components 115, 120 or the processing device 110 can be updated. The update can be initiated or controlled by a person, to which end a further device 180 can be provided, which is currently embodied by way of example as a smartphone and can be connected communicatively to the household appliance 105 and/or the remote location 108.

Figure 2:
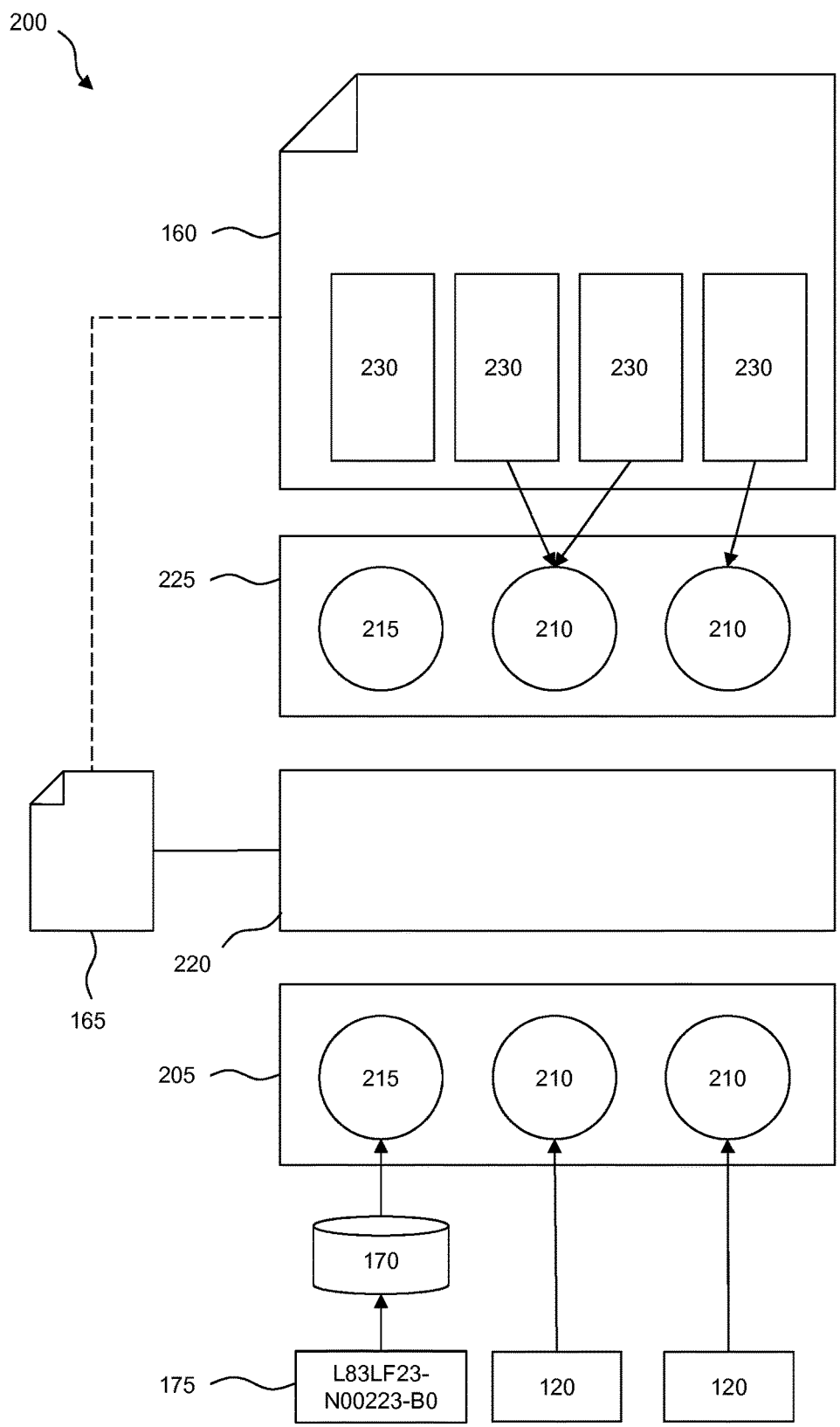
FIG. 2 shows a flow chart of an exemplary method.

FIG. 2 shows an illustration of an update process 200. An existing configuration 205 of the household appliance 105 can be determined by a state 210 of a component 110, 115, 120 being determined dynamically. Moreover, an attribute 215 of a component 110-125 can be determined and form a further part of the existing configuration 205. In order to determine the attribute 215, the identification 175 can be used as a key for the assignment table 170, in order to determine information, which is assigned to the household appliance 105. On the basis of this information, the attribute 215 can then be determined. The assignment table 170 can be produced on the basis of documents of a manufacturer of the household appliance 105. In particular, information relating to the installed components 110-130 can be stored in the assignment table 170. Such information can also only be added to the assignment 170 subsequently, in particular only when it is known which attribute 215 for the determination of the configuration 205 is relevant for a predetermined item of update information 160.

A method 220 which can run in particular in the form of a computer program on one of the processing apparatuses 110 or 145 can check whether the existing configuration 205 meets the restriction 165 assigned to the predetermined update information 160. If this is the case, a target configuration 225 can be determined, which the household appliance 105 is to have after the update. The target configuration 225 can comprise one or more changed states 210. An attribute 215 of the existing configuration 205 can typically not be changed by the update, the unchanged attribute 225 can however be included in the target configuration 225. The target configuration 225 can be checked by an operator, for instance, before the actual update. Program parts, information or parameters can then be updated on components 110, 115, 120, 130 of the household appliance 105.

The actual update can comprise playing out information, which can be stored in different blocks 230 of the update information 160. An assignment of one or more blocks 230 to one or more components 110, 115, 120 can be defined by the generated target configuration 225 or determined in another way in particular by means of the method 220. An exemplary assignment is indicated in FIG. 2 by arrows.

Figure 3:
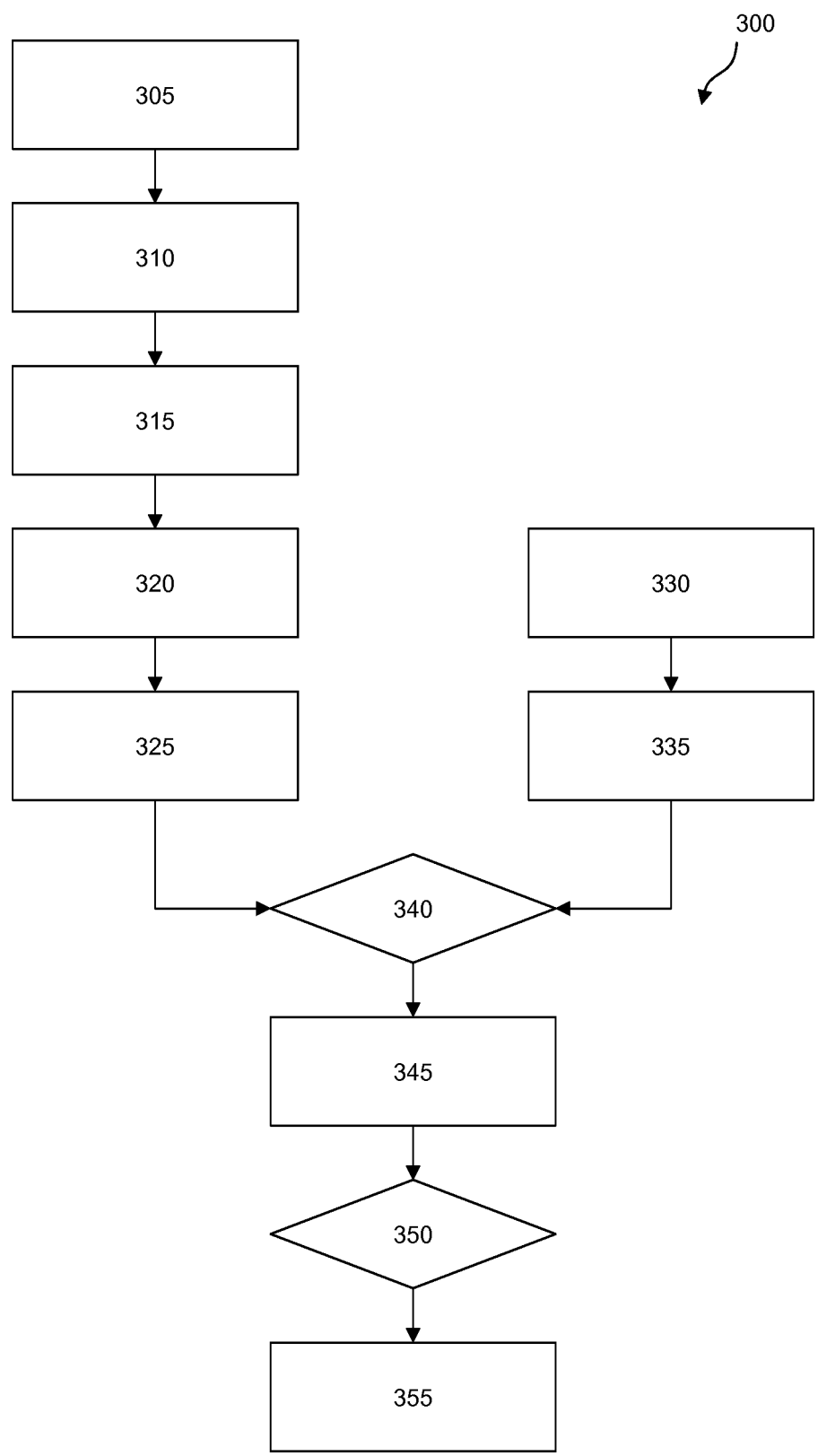
FIG. 3 shows an illustration of an update process.

FIG. 3 shows a flow chart of an exemplary method 300 which can comprise in particular one part or the entire method 220 in FIG. 2. The method 300 can be carried out in particular by means of the processing facility 110 of the household appliance 105. A part of the method 300 can also be carried out externally, in particular by the remote location 108.

In a step 305, components 110-130 which are attached in the household appliance 105 can be determined. To this end, known active components 110, 115, 120, 130 can be contacted by means of corresponding queries. A component 110-130 can provide information about itself and/or about a connected passive component 125. In a step 310, states 210 of at least the active ones among the components determined 115, 120 can be identified. A state 210 can be provided in response to a corresponding query from the respective active components 115, 120.

In step 315, the identification 175 of the household appliance 105 can be determined. The identification 175 can be stored in an electronically readable manner in a memory provided therefor. Alternatively, the identification 175 can also be provided by a user, for instance by means of the mobile telephone 180. The identification 175 can be attached in a readable manner on an exterior of the household appliance 105. An attribute 215 of a component 110-130 can be determined on the basis of the identification 175, as detailed more precisely above. The collected states 210 and attributes 215 can be used in step 325 to determine the configuration 205.

In step 330, update information 160 can be provided. The update information 160 is typically downloaded from the remote location by way of the connection 140 to the household appliance 105; other supply channels are also possible, however, with the aid of a data carrier, for instance. In step 335, the restriction 165 assigned to the update information 160 can be determined. Steps 330, 335 can be realized parallel with steps 305-325. In one embodiment, the restriction 165 can be provided before, on its basis, the configuration 205 is determined in steps 305-325. Irrelevant states 210 or attributes 215 can thus remain undetermined.

In step 340, it is possible to determine whether the particular configuration 205 meets the restriction 165. If this is the case, in step 345 the target configuration 225 can be produced. An authorization relating to the target configuration 225 can be acquired in step 350 and in step 355 the update information 160 can be applied to the household appliance 105 and its components 110-130.

REFERENCE CHARACTERS 100 system
105 household appliance
108 remote location
110 processing facility
115 active component
120 active component
125 passive component
130 communication facility
135 communication facility
140 connection
145 processing facility
150 first data memory
155 second data memory
160 update information
165 restriction
170 assignment table
175 identification
180 appliance
200 update process
205 existing configuration
210 state
215 attribute
220 method (update program)
225 target configuration
230 block
300 method
305 determine components
310 determine states of the components
315 determine identification
320 determine attribute
325 determine configuration
330 provide update information
335 provide restriction
340 agreement?
345 provide target configuration
350 approval?
355 update control information

The invention claimed is:

1. A method for updating a household appliance, which comprises the following steps of:
 determining a configuration of the household appliance, wherein the configuration relating to a state of at least one passive component of the household appliance, the configuration containing an attribute of the at least one passive component of the household appliance, and the attribute, are determined on a basis of an identification of the household appliance and assignment of the identification to the attribute, wherein the attribute cannot be determined dynamically by any component of the household appliance, and is, therefore, retrieved from an update server that includes a first data memory storing an identification of the household appliance and an attribute assigned to the identification;
 determining a restriction assigned to predetermined update information for household appliances, which includes the household appliance; and
 updating control information of the at least one passive component of the household appliance based on the predetermined update information if the configuration of the household appliance fulfills the restriction.

2. The method according to claim 1, wherein the restriction contains a plurality of configurations.

3. The method according to claim 1, wherein the attribute contains an existence, a variant, a design, an embodiment, or a capability of the at least one component of the household appliance.

4. The method according to claim 1, wherein the attribute assigned to the identification can be changed.

5. The method according to claim 1, wherein the state contains an existence, embodiment, setting or version of control information of the at least one component.

6. The method according to claim 1, wherein the predetermined update information includes an application program for the at least one component of the household appliance.

7. The method according to claim 1, wherein the predetermined update information contains an embedded program of the at least one component of the household appliance.

8. A control facility for a household appliance having at least one passive component, the control facility comprising:
 a communicator designed to receive update information; and
 a processor including a combination of hardware and software configured to:
  determine an attribute of the at least one passive component on a basis of an identification of the household appliance, wherein the attribute cannot be determined dynamically by any component of the household appliance;
  determine a configuration of the household appliance on a basis of the attribute and a state of the at least one passive component; and
  update control information of the at least one passive component on a basis of update information if the configuration of the household appliance fulfills a predetermined restriction which is assigned to the update information.

9. An update server, comprising:
 a communicator;
 a first non-transitory, electronically readable data memory for storing an identification of a household appliance and an attribute assigned to the identification;
 a second non-transitory, electronically readable data memory for storing update information; and
 a processor including a programmable microcomputer or microcontroller configured to determine the attribute on a basis of the identification of the household appliance received by means of said communicator, and to provide stored update information for the household appliance if a configuration of the household appliance, which contains the attribute and a state of at least one passive component of the household appliance, meets a restriction which is assigned to the update information, wherein the attribute cannot be determined dynamically by any component of the household appliance.

10. The update server according to claim 9, wherein said processor is configured to determine the configuration.

* * * * *